United States Patent
Nomichi et al.

(10) Patent No.: US 7,811,039 B2
(45) Date of Patent: Oct. 12, 2010

(54) SCREW LOOSENING PREVENTION STRUCTURE AND GAS PRESSURE DEVICE INCLUDING SAME

(75) Inventors: Kaoru Nomichi, Ono (JP); Makoto Ninomiya, Kobe (JP); Yutaka Suzuki, Kobe (JP); Hiroshi Ito, Akashi (JP)

(73) Assignee: Kabushiki Kaisha Kawasaki Precision Machinery, Kobe-shi (JP)

( * ) Notice: Subject to any disclaimer, the term of this patent is extended or adjusted under 35 U.S.C. 154(b) by 526 days.

(21) Appl. No.: 11/651,941

(22) Filed: Jan. 9, 2007

(65) Prior Publication Data

US 2007/0172330 A1    Jul. 26, 2007

(30) Foreign Application Priority Data

Jan. 13, 2006  (JP)  ............... 2006-006365

(51) Int. Cl.
*F16B 43/02* (2006.01)

(52) U.S. Cl. .............. 411/542; 220/304; 220/378; 215/356; 277/644

(58) Field of Classification Search .......... 411/147, 411/155, 156, 154, 542, 383; 220/560.5, 220/203.13, 235, 237, 327, 304, 378; 277/644; 215/356

See application file for complete search history.

(56) References Cited

U.S. PATENT DOCUMENTS

| | | | | |
|---|---|---|---|---|
| 2,394,097 A | * | 2/1946 | Parker | 285/220 |
| 3,058,750 A | * | 10/1962 | Taylor | 277/312 |
| 3,207,524 A | * | 9/1965 | Trbovich | 277/647 |
| 3,346,274 A | * | 10/1967 | Baron | 285/52 |
| 3,992,974 A | * | 11/1976 | Miki et al. | 411/544 |
| 4,026,183 A | * | 5/1977 | Bart | 411/542 |
| 4,056,144 A | * | 11/1977 | Wellstein | 166/85.2 |
| 4,253,583 A | * | 3/1981 | Lynch | 220/319 |
| 4,282,982 A | * | 8/1981 | Nuesslein | 220/237 |
| 4,671,546 A | * | 6/1987 | Arav | 285/368 |

(Continued)

FOREIGN PATENT DOCUMENTS

JP     SHO46-8496      3/1971

(Continued)

OTHER PUBLICATIONS

ISA European Patent Office, Search Report of EP 07 25 0132, Feb. 25, 2010, Germany, 4 pages.

*Primary Examiner*—Gary Estremsky
(74) *Attorney, Agent, or Firm*—Alleman Hall McCoy Russell & Tuttle LLP

(57) ABSTRACT

A screw loosening prevention structure and a gas-pressure device are provided. The structure includes a first member that is formed with a container space filled with gas, and includes a first threaded portion, a second member that includes a second threaded portion, wherein the second member is threadedly coupled with the first member by threadedly engaging the second threaded portion with the first threaded portion, and receives a pressure from the gas in the container space of the first member, and a spring member provided between the first and second members in a deformed state in which the displacement of the spring member is greater than a relative displacement of the first and second members due to a loosening factor including the gas pressure that is received by this second member.

16 Claims, 12 Drawing Sheets

U.S. PATENT DOCUMENTS

| | | | | |
|---|---|---|---|---|
| 4,877,272 A | * | 10/1989 | Chevallier et al. | 285/111 |
| 5,013,199 A | * | 5/1991 | Downes | 411/544 |
| 6,361,257 B1 | * | 3/2002 | Grant | 411/154 |
| 6,368,542 B1 | * | 4/2002 | Steil et al. | 264/328.14 |
| 6,527,304 B1 | * | 3/2003 | Pliassounov | 285/334.5 |
| 2003/0066836 A1 | | 4/2003 | Sakaguchi et al. | |

FOREIGN PATENT DOCUMENTS

| | | |
|---|---|---|
| JP | 2001-159415 | 6/2001 |
| JP | 2001159415 | 6/2001 |

* cited by examiner

SCREW LOOSENING PREVENTION STRUCTURE AND GAS PRESSURE DEVICE INCLUDING SAME

CROSS-REFERENCE TO RELATED APPLICATION

The present application claims priority from Japanese Patent Application No. 2006-006365 filed Jan. 13, 2006, which is hereby incorporated by reference in its entirety for all purposes.

TECHNICAL FIELD

The present invention relates to a gas-pressure device configured so that a first member having container space filled with gas is threadedly coupled with a second member, and to a structure for preventing loosening of threaded portions of the first and second members.

BACKGROUND

FIG. 1 is a partial cross-sectional view showing a tank device 1 as an example of a conventional gas-pressure device. The tank device 1 is configured so that a valve unit 4 is attached to an opening portion 3 of a tank body 2, and gas is contained in a container space 5 of the tank body 2 and is exhausted from the container space 5 by controlling the valve unit 4. An inner thread is formed in the opening portion 3 of the tank body 2, and an outer thread is formed in the valve unit 4. The valve unit 4 is threadedly coupled with the opening portion 3 of the tank body 2. A seal member 6 is provided between the opening portion 3 of the tank body 2 and the valve unit 4.

A tip-end portion 3a of the opening portion 3 of the tank body 2 and a contact portion 4a of the valve unit 4 are in contact with each other in the axial direction. The valve unit 4 is threadedly coupled with the opening portion 3 with a tightening torque such that a tightening force Fc mutually acts on the tip-end portion 3a and the contact portion 4a. In such a configuration, if the tightening force Fc decreases, surface pressure acting on the contact surfaces 3a and 4a that prevents a rotation of the valve unit 4 with respect to the tank body 2 also decreases. Accordingly, as vibrations and impulse forces act on the device, the valve unit 4 may rotate with respect to the tank body 2, and the threaded engagement between the opening portion 3 and the valve unit 4 may then be loosened.

Factors that cause the decreasing of the tightening force Fc are, for example, a pressure of the gas contained in the container space 5, and a thermal expansion of the tank body 2 and the valve unit 4 due to a change in the ambient temperature $\Delta T$. A pressing force Fp caused by the pressure of the gas contained in the container space 5 acts in a direction to which the valve unit 4 threadedly moves back with respect to the tank body 2, thereby decreasing the tightening force Fc. Further, where the tank body 2 and the valve unit 4 are made of materials that have a different coefficient of thermal expansion, when the ambient temperature changes, the tightening force Fc changes in accordance with the temperature change $\Delta T$ and the combination of the materials of the tank body 2 and the valve unit 4.

In order to prevent the loosening of the threaded portions, it is necessary to keep the tightening force Fc from reaching zero even when the pressure force Fp acts and the tank body 2 and the valve unit 4 thermally expand due to the ambient temperature change $\Delta T$. Therefore, upon threadedly coupling the valve unit 4 with the tank body 2, an initial tightening torque should be given so that an initial tightening force Fc satisfies the following Equation (1).

$$Fc > Fp + F\{f(\Delta T)\} \tag{1}$$

Here, $F\{f(\Delta T)\}$ is an amount of decrease in the tightening force Fc due to the ambient temperature change $\Delta T$. Since the tank device 1 does not include a configuration that positively prevents the loosening of the threaded portions, the valve unit 4 is threadedly coupled with the tank body 2 with the initial tightening torque such that the tightening force Fc is large enough to satisfy the Equation (1).

Japanese Examined Utility Model Publication No. SHO 46-8496 discloses a non-loosening nut that is a combination of a nut and a washer formed from an elastic plate. The non-loosening nut is configured so that the elastic washer is partially pressure-bonded to a thread of a bolt to avoid the loosening of the nut. Further, Japanese Laid-open Patent Application No. 2001-159415 discloses a loosening prevention nut that is similar to the non-loosening nut of Japanese Examined Utility Model Publication No. SHO 46-8496, where an elastic ring made of a flat-spring material etc. is attached to a top portion of the nut body. Although the nuts of Japanese Examined Utility Model Publication No. SHO 46-8496 and Japanese Unexamined. Patent Publication No. 2001-159415 include a type of flat spring for loosening prevention, they are not configured so that a pressure acts on the nut or bolt. Thus, they are not configured to prevent loosening of the threaded portions caused due to pressure.

As mentioned above, the tank device 1 is not configured to positively prevent the loosening of the threaded portions and, thus, even if it adopts the configuration of Japanese Examined Utility Model Publication No. SHO 46-8496 and Japanese Laid-open Patent Application No. 2001-159415, the loosening of the threaded portions cannot be prevented. For this reason, the valve unit 4 is threadedly coupled with the tank body 2 so that the large initial tightening torque is given to the valve unit 4 to obtain the large tightening force Fc.

For the tank device 1, the pressing force Fp that acts on the valve unit 4 becomes larger as the gas pressure in the container space 5 becomes higher, and as the pressure-receiving area of the valve unit 4 becomes larger by making an inner diameter of the opening portion 3 larger. Moreover, in a case where the tank device 1 is used in an operating condition in which the ambient temperature changes over a wide temperature variation range, an amount of decrease in the tightening force Fc due to the temperature change $\Delta T$, that is $F\{f(\Delta T)\}$, becomes greater. In such a case, when at least either one of the pressure force Fp and the amount of decrease $F\{f(\Delta T)\}$ becomes greater, in order to obtain the tightening force Fc that satisfies the Equation (1), a considerably large initial tightening torque is required and, thus, this operation is difficult.

Moreover, the threaded portions of the opening portion 3 and the valve unit 4 must have strength to sustain against a resultant force of the tightening force Fc and the pressure force Fp. Accordingly, for the configuration in which a large tightening force Fc is required, it is necessary to extend the dimension of the threaded portions in the axial direction to ensure a large strength of the threaded portions. Further, as the dimension of the threaded portions becomes greater, a ratio at which the opening portion 3 occupies within the tank device 1 becomes greater, and a container capacity of the container space 5 becomes less.

DESCRIPTION OF THE INVENTION

The present invention addresses the above-mentioned conditions and provides a screw loosening prevention structure and a gas-pressure device having thereof, capable of preventing loosening of threaded portions, without need of an extension of dimension of the threaded portions, and without need of a larger initial tightening torque.

According to one aspect of the invention, a screw loosening prevention structure includes a first member that is formed with a container space filled with gas, and includes a first threaded portion, a second member that includes a second threaded portion, wherein the second member is threadedly coupled with the first member by threadedly engaging the second threaded portion with the first threaded portion, and receives a pressure from the gas in the container space of the first member, and a spring member provided between the first and second members in a deformed state in which the displacement of the spring member is greater than a relative displacement of the first and second members due to a loosening factor including the gas pressure that is received by the second member.

According to the above-mentioned aspect, the first and second members are threadedly coupled with each other by threadedly engaging the first and second threaded portions, and a spring member is provided between the first and second members. By providing the spring member, it is possible to prevent the loosening of the first and second threaded portions. The first member is formed with the container space that is filled with gas. The second member receives a pressure from the gas in the container space of the first member. This pressure causes the loosening of the first and second threaded portions. The spring member is provided in the deformed state in which the displacement of the spring member is greater than the relative displacement of the first and second members due to the loosening factor including the pressure. The spring member can be held in the state in which it is deformed from an unloaded state, and can exert a spring force, even if the first and second members are relatively displaced due to the loosening factor. This spring force is a tightening force of the first and second threaded portions.

Therefore, due to the loosening factors, even if the first and second members are relatively displaced, the tightening force does not become zero and, thereby preventing the loosening of the first and second threaded portions. In addition, the spring force to be exerted by the spring member may be less than the pressing force due to the pressure of the gas in the container space, thus making the initial tightening torque less. Moreover, a strength required for the first and second threaded portions may be less, and the dimension of the first and second threaded portions may also be less. Accordingly, it is possible to prevent the loosening of the first and second threaded portions without enlarging the dimension of the first and second threaded portions, and enlarging the initial tightening torque.

The spring member may have a characteristic in which a spring constant thereof becomes less as the displacement of the spring member becomes greater from an unloaded state.

According to this configuration, the spring member includes a domain of deformation where the change in the spring force is smaller, even if the change in the deformation of the spring is greater. Therefore, a stable spring force can be exerted so that the tightening force may not become zero, even if the relative displacement of the first and second members due to the loosening factor is greater. Accordingly, the loosening of the first and second threaded portions can be prevented, even if the loosening factor includes not only the pressure in the container space, but also, for example, a difference in the coefficient of thermal expansion of the first and second members, and a dimensional accuracy of the first and second members, etc. In other words, it is not necessary to take the coefficient of thermal expansion of the first and second members into consideration, and flexibility in selection of materials can be higher, and a high dimensional accuracy of the first and second members is not required.

Moreover, the spring member may have a sealing characteristic, and may be provided in a position more distant from the container space than the first and second threaded portions.

According to the above-mentioned configuration with the spring member having the sealing characteristic, it is possible to prevent foreign substances, such as water, dirt, dust, etc., from infiltrating the first and second threaded portions from outside. Therefore, damage including corrosion of the first and second threaded portions by infiltration of the foreign substances can be prevented. For example, if the first and second members are made of different materials, and if water infiltrates, there may be a possibility that electrical corrosion or erosion may occur. However, since the infiltration of water can be prevented as mentioned above, this electrical corrosion or erosion can be prevented. Therefore, a reduction of the strength of the first and second threaded portions due to such damage can be prevented, and durability and reliability can be improved.

Moreover, a seal member may be provided between the first and second members, in a position closer to the container space than the first and second threaded portions. A pressure-release structure may be provided to release the pressure of the gas between the seal member and the spring member.

According to the above-mentioned configuration, the infiltration of the foreign substances from outside is prevented by the spring member, and leakage of the gas from the container space is prevented by the seal member. By this double-seal configuration, the spring member may have at the least a tolerance to the foreign substances from outside, and the seal member may have at the least a tolerance to the gas in the container space. The spring member and the seal member do not need to have the tolerances to both the foreign substances from outside and the gas in the container space. Therefore, the flexibility in selection of the materials for the spring member and the seal member can be higher, and durability of the spring member and the seal member can be higher.

Furthermore, according to the above-mentioned configuration, since the pressure-release structure is provided, it is possible to prevent the pressure of the gas between the seal member and the spring member from increasing too high. Therefore, it is possible to prevent a failure of the first and second threaded portions, such as a deformation.

Moreover, according to the second aspect of the invention, a gas-pressure device may include any one of the above-mentioned screw loosening prevention structures. According to this aspect, it is possible to realize a suitable gas-pressure device in which the loosening of the first and second threaded portions does not occur.

Moreover, according to this aspect, due to the loosening factors, the tightening force does not become zero, even if the first and second members are relatively displaced. Thus, the loosening of the first and second threaded portions can be prevented. In addition, it is possible to prevent the loosening of the first and second threaded portions without the need for extending the dimension of the first and second threaded portions, or the need for increasing the initial tightening torque.

Moreover, according to this aspect, a stable spring force can be exerted so that the tightening force may not become zero, even if the relative displacement of the first and second members due to the loosening factors is greater. It is not necessary to take the coefficient of thermal expansion of the first and second members into consideration, can make the flexibility in selection of materials be higher, and does not require a high dimensional accuracy of the first and second members.

Moreover, according to this aspect, by the spring member, it is possible to prevent the infiltration of foreign substances, and it is possible to prevent damage of the first and second threaded portions. Therefore, the strength reduction of the first and second threaded portions due to such damage can be prevented, and the durability and reliability can be improved.

Moreover, according to this aspect, the spring member has a tolerance to the foreign substances from outside, and the seal member has a tolerance to the gas in the container space. Therefore, it is possible to increase the flexibility in selection of materials for the spring member and the seal member, and it is possible to increase the durability of the spring member and the seal member. Moreover, it is possible to prevent the pressure of the gas between the seal member and the spring member from increasing too high.

Moreover, according to this aspect, it is possible to realize a suitable gas-pressure device without the loosening of the first and second threaded portions.

BRIEF DESCRIPTION OF THE DRAWINGS

The disclosure is illustrated by way of example and not by way of limitation in the figures of the accompanying drawings, in which the like reference numerals indicate similar elements and in which.

DETAILED DESCRIPTION

Figure 2:
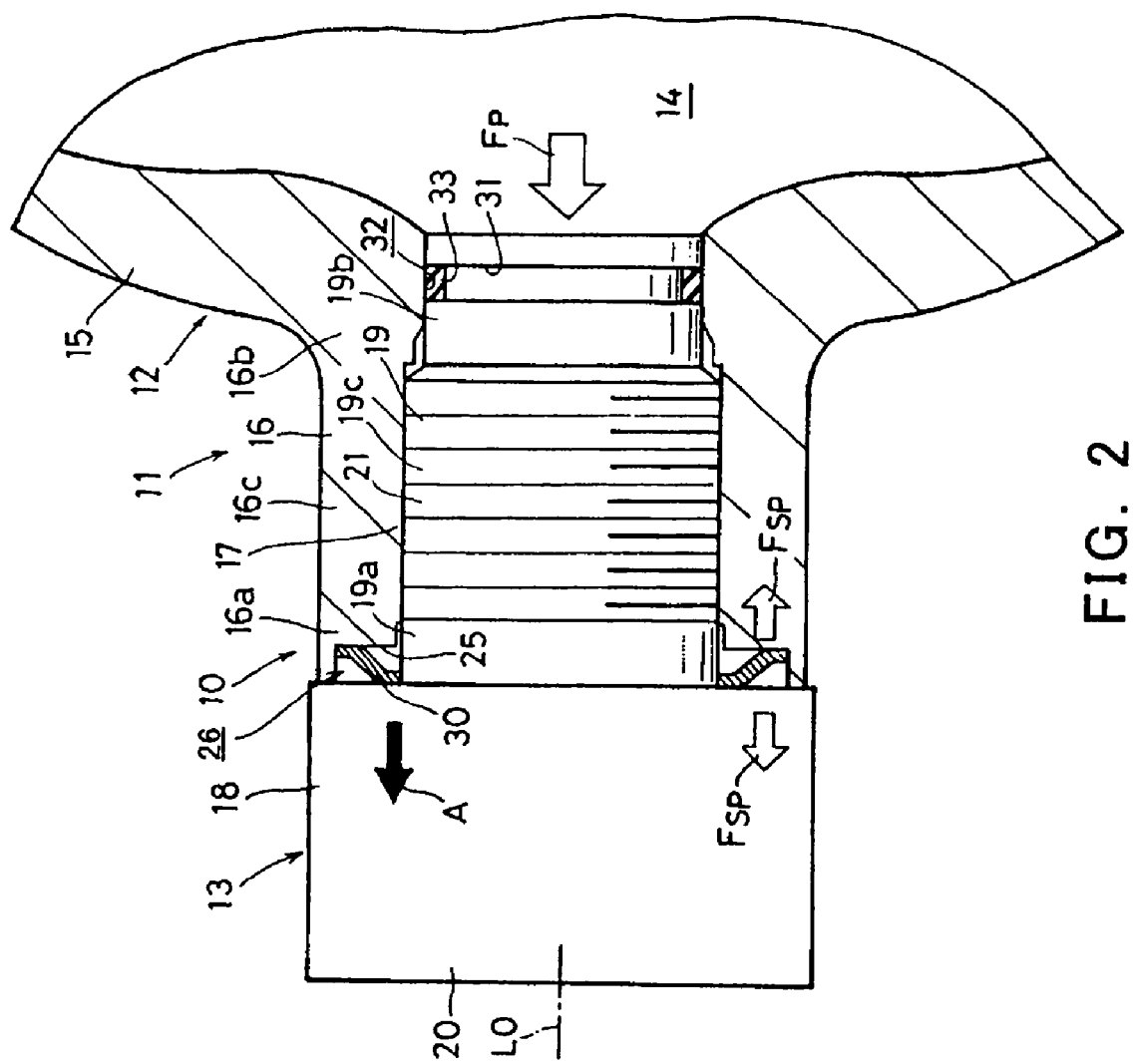
FIG. 2 is a partial cross-sectional view showing the tank device equipped with a screw loosening prevention structure according to one embodiment of the invention.

FIG. 2 is a cross-sectional view showing a tank device 11 equipped with a screw loosening prevention structure 10 according to one embodiment of the invention. The tank device 11, that is one example of a gas-pressure device, is a device that can be suitably implemented for an oxygen tank which a firefighter carries on his back at a fire site, or a fuel tank for a natural gas vehicle and a fuel cell electric vehicle, for example. This tank device 11 includes a tank body 12 and a valve unit 13.

The tank body 12 is generally a cylindrical container. This tank body 12 includes a main body portion 15 in which a container space 14 is formed, and an opening portion 16 that connects with the main body portion 15 and that is formed with an opening space that connects with the container space 14 and an exterior space. The container space 14 contains gas in a state in which it has a pressure at least higher than an atmosphere pressure. While typically the gas contained in container space 14 is in a gaseous state, it will be appreciated that a portion of the gas may be in a liquefied state. The gas may be fuel gas, such as oxygen gas, natural gas, and hydrogen gas, for example.

The first axial end portion of the main body portion 15 is provided with the opening portion 16 so as to protrude outward from the main body portion 15. The opening portion 16 is cylindrical, and has a smaller inner diameter and a smaller outer diameter than that of the main body portion 15. The opening portion 16 includes a female threaded portion 17 that is an inner thread formed in an intermediate portion 16c defined between both the axial end portions 16a and 16b. This opening portion 16 may be referred to as a mouthpiece portion, etc.

The valve unit 13 is attached to the opening portion 16 of the tank body 12 so that it is partially inserted in the opening portion 16. The valve unit 13 is able to control an exhaust state of the gas contained in the container space 14 of the tank body 12 by adjusting the valve opening thereof. For example, the valve unit 13 may be able to control exhausting and non-exhausting of the gas by including a valve element that is configured to open and close. Moreover, for example, the valve unit 13 may be able to exhaust the gas in a state in which it is depressurized by including a reduced-pressure valve.

Although the valve element of the valve unit 13 is not limited to the illustrated valves, the valve unit 13 may be configured to include at least one valve element, and to control the exhaust state of the gas. Moreover, the valve element of the valve unit 13 may be configured to operate in response to an electric command signal, or it may be configured to operate in response to a command signal to be generated according to a pilot pressure, or it may be configured to operate by a manual operation.

The valve unit 13 is configured so that the valve housing 18 accommodates various component members including the valve element. The valve housing 18 includes an approximately cylindrical shaft portion 19, and a head portion 20 that is formed continuously from the first axial end portion 19a of the shaft portion 19. The head portion 20 protrudes radially outward from the shaft portion 19. In this embodiment, the head portion 20 is configured to have a larger diameter than the shaft portion 19. The shaft portion 19 includes a male threaded portion 21 that is an outer thread formed on the intermediate portion 19c defined between both the axial end portions 19a and 19b. The valve unit 13 is threadedly coupled with the tank body 12 so that the male threaded portion 21 of the shaft portion 19 is threadedly coupled within the female threaded portion 17 of the opening portion 16.

In this embodiment, the valve unit 13 is attached to the tank body 12 in a state in which the shaft portion 19 is inserted in the opening portion 16, as described above. By the threaded portions 17 and 21, the valve unit 13 threadedly advances into the tank body 12 as it rotates to the first direction about a center axis L0, and the valve unit 13 threadedly moves back from the tank body 12 as it rotates to the second direction about the center axis L0. When the head portion 20 contacts the first axial end portion 16a of the opening portion 16, the valve unit 13 is positioned, and it is then prevented from further threadedly advancing from the position. In this embodiment, the valve unit 13 is referred to be in an attached state when it is in the positioned state as described above. The first axial end portion 16a of the opening portion 16 is an end portion that is located on the opposite side from the main body portion 15. The valve unit 13 receives the pressure of the gas in the container space 14 when it is threadedly attached to the opening portion 16.

A recess 25 is formed in an end surface of the first axial end portion 16a of the opening portion 16 and in a radially inner portion of the end surface, so as to extend throughout in the circumferential direction. By this recess 25, when the valve unit 13 is attached to the opening portion 16, an annular spring housing space 26 extending in the axial direction is formed between the first axial end portion 16a of the opening portion 16 and the head portion 20 of the valve housing 18. A spring member 30 is housed in this spring housing space 26 so that it is provided between the opening portion 16 and the valve housing 18 of the valve unit 13. The head portion 20 of the valve housing 18 contacts a radially outer portion of the end surface of the first axial end portion 16a.

A seal groove 31 is formed in the second axial end portion 19b of the shaft portion 19 so as to extend throughout an outer circumference thereof. By this seal groove 31, when the valve unit 13 is attached to the opening portion 16, an annular seal housing space 32 is formed so as to provide a radial gap between the second axial end portion 16b of the opening portion 16 and the end portion 19b of the shaft portion 19. A seal member 33, such as an O-ring, is provided between the opening portion 16 and the valve housing 18 of the valve unit 13 so as to be housed in the seal housing space 32.

The tank device 11 includes a screw loosening prevention structure 10, and the screw loosening prevention structure 10 includes at least the tank body 12, the valve housing 18, and the spring member 30. In this embodiment, the screw loosening prevention structure 10 further includes the seal member 33. Here, in this embodiment, the tank body 12 corresponds to a first member, and the female threaded portion 17 corresponds to a first threaded portion. Further, the valve housing 18 corresponds to a second member, and the male threaded portion 21 corresponds to a second threaded portion.

The tank body 12, the valve housing 18, and the spring member 30 are made of metal, for example. Both the tank body 12 and the valve housing 18 may be made of aluminum, or the both may be made of stainless steel, or one of those may be made of aluminum, and the other may be made of stainless steel. In this embodiment, the tank body 12 is made of aluminum, the valve housing 18 is made of stainless steel, and the spring member 30 is made of stainless steel, for example. The seal member 33 may be made of synthetic resin or rubber including natural rubber and synthetic rubber.

Figure 3:
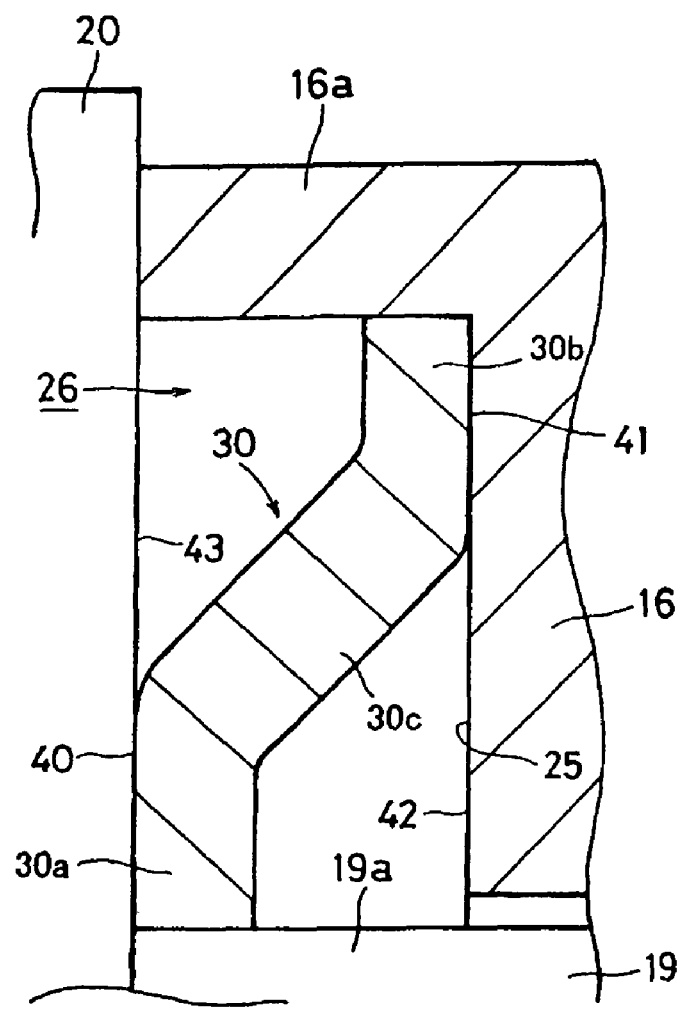
FIG. 3 is an enlarged cross-sectional view showing a section where the spring member of FIG. 2 is provided.
Figure 4:
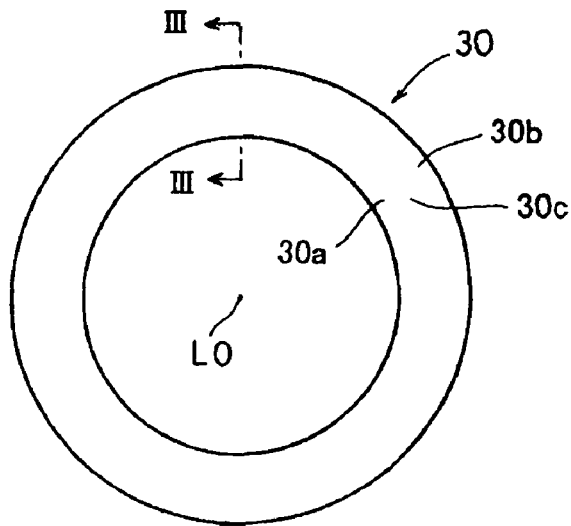
FIG. 4 is an axial view of the spring member shown in FIG. 2.

FIG. 3 is an enlarged cross-sectional view showing a section where the spring member 30 of FIG. 2 is provided. FIG. 4 is an axial view of the spring member 30. FIG. 3 shows a cross-section of the spring member 30 shown in FIG. 4, cut along a line III-III. In this embodiment, the spring member 30 is of an annular-plate shape, and is a member such that it has a uniform shape throughout in the circumferential direction. The spring member 30 includes an inner circumference portion 30a and an outer circumference portion 30b. The inner circumference portion 30a protrudes to one axial direction with respect to the outer circumference portion 30b. The spring member 30 has approximately an S-shape in the cross-section cut by a plane including the center axis L0. The cross-sectional shape cut by the plane including the center axis L0 is uniform throughout in the circumferential direction. The inner circumference portion 30a and the outer circumference portion 30b are each in a flat plane shape perpendicular to the center axis L0, and both are connected continuously with a connecting portion 30c that is in a truncated cone shape.

When the spring member 30 is housed in the spring housing space 26, an inner circumference contact surface 40 and an outer circumference contact surface 41 of the spring member 30 are supported by walls surrounding the spring housing space 26 so that the spring member 30 is deformed and compressed in the axial direction. In this state, an axial offset between the inner circumference portion 30a and the outer circumference portion 30b is reduced. Either one of the inner circumference contact surface 40 or the outer circumference contact surface 41 of the spring member 30 may be elastically contacted and supported by an opening-portion spring seat 42, the other may be elastically contacted and supported by a head-portion spring seat 43. In this embodiment, the outer circumference contact surface 41 is supported by the opening-portion spring seat 42, and the inner circumference contact surface 40 is supported by the head-portion spring seat 43.

The inner circumference contact portion 40 is an end surface of the inner circumference portion 30a in the axial direction that is located opposite from the outer circumference portion 30b. The outer circumference contact portion 41 is an end surface of the outer circumference portion 30b in the axial direction that is located opposite from the inner circumference portion 30a. The opening-portion spring seat 42 is a radially inner portion of the end surface of the first axial end portion 16a. The head-portion spring seat 43 is a portion of the end surface of the head portion 20 in the axial direction, which is located in proximity to the shaft portion 19.

The outer circumference contact surface 41 is in close contact with the opening-portion spring seat 42 continuously throughout the circumference and, thereby achieving sealing. Similarly, the inner circumference contact surface 40 is in close contact with the head-portion spring seat 43 continuously throughout the circumference and, thereby achieving a seal. As described above, the spring member 30 has a sealing characteristic. The spring member 30 is disposed at a position more distant from the container space 14 than the threaded portions 17 and 21. At this position, the spring member 30 is able to seal between the opening portion 16 and the valve housings 18.

The seal member 33 is disposed at a position closer to the container space 14 than the threaded portions 17 and 21. At this position, the seal member 33 is able to seal between the opening portion 16 and the valve housings 18. Thus, by the seal member 33 and the spring member 30, the seal between the opening portion 16 and the valve housing 18 is achieved at two places, that is, at each end of the threaded portions 17 and 21 in the axial direction, respectively.

For example, the spring member 30 may be formed by piercing a spring stainless-steel plate in an annular shape, and, at the same time or then bending the pierced plate so that the inner circumference portion 30a protrudes to one axial direction with respect to the outer circumference portion 30b. Therefore, the spring member 30 may be easily formed.

Figure 5:
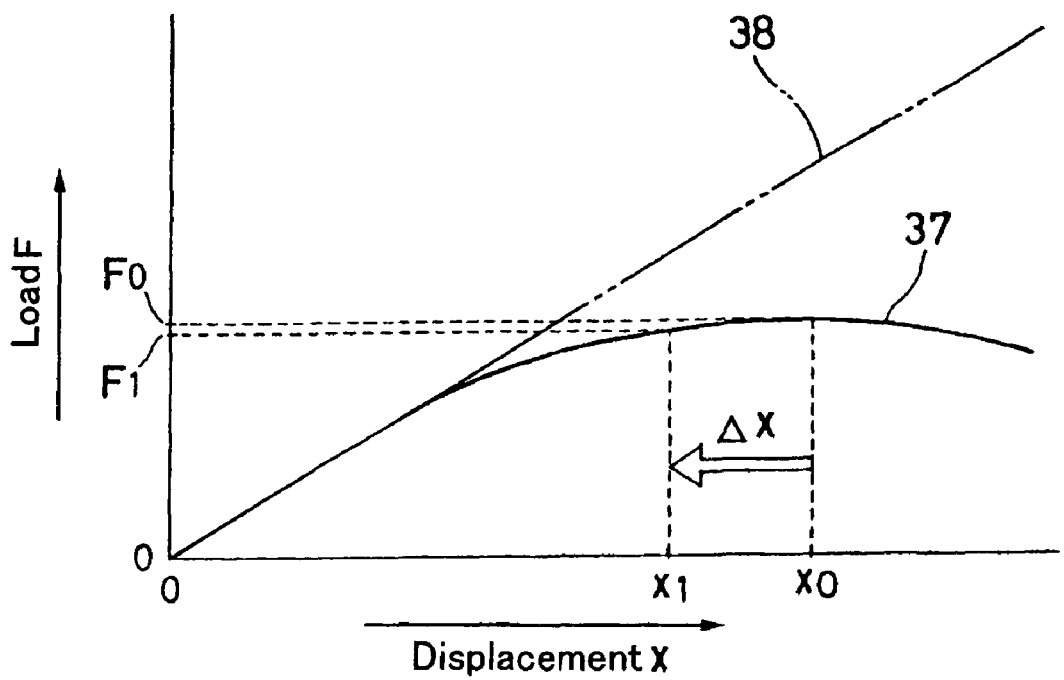
FIG. 5 is a graph showing a spring constant of the spring member shown in FIG. 2.

FIG. 5 is a graph showing a spring constant of the spring member 30. A horizontal axis shows a displacement x from an unloaded state, and a vertical axis shows a load F acting on the spring member 30. The spring member 30 has a characteristic in which a relationship between the load F and the displacement x shows a convex curve such as a solid line 37 in FIG. 5, rather than becoming linear such as a two-dot-chain line 38. That is, the spring constant k (=F/x) of the spring member 30 is not a constant value regardless of the displacement x, and it becomes less as the displacement x becomes greater. Therefore, the spring member 30 has a domain where a change in the load F over a change in the displacement x is smaller (hereinafter, refer to as a "Small Load Change Domain").

This Small Load Change Domain includes, for example, in the graph of FIG. 5, a domain in which the displacement x is greater than a first displacement x1 and less than a second displacement x0, or a larger domain including the domain. In a domain in which the displacement x is smaller than the Small Load Change Domain, the change in the load F over the change in the displacement x is greater. On the other hand, in a domain in which the displacement x is greater than the first displacement x1 and less than the second displacement x0, a change in the load F (ΔF=F0−F1) over a change in the displacement x (Δx=x0−x1) is less. Thus, the spring member 30 with such a spring constant may be used.

The spring member 30 may be provided in a state in which, when the head portion 20 is positioned and contacts the first axial end portion 16a of the opening portion 16, an initial displacement x is within the Small Load Change Domain. The spring member 30 may be provided, for example, so that the initial displacement x is equal to the second displacement x0.

A spring force of this spring member 30 acts on each of the spring seats 42 and 43 that support the spring member 30, as a tightening force Fsp. The tightening force Fsp can maintain a tightened state in which the threaded portions 17 and 21 are engaged with each other in the axial direction. If this tightening force Fsp becomes zero and the tightened state of the threaded portions 17 and 21 is cancelled, the frictional resisting force that prevents a relative rotation of the threaded portions 17 and 21 will be lost. Then, if vibrations or impact forces act, the valve unit 13 rotates about the center axis L0 with respect to the tank body 12, the valve unit 13 threadedly moves back and, thus, a loosening will occur between the threaded portions 17 and 21.

The tightening force Fsp decreases as the valve unit 13 is displaced in a direction A (see FIG. 2) to which the valve unit 13 moves back from the tank body 12 (hereinafter, refer to as a "move-back direction"). Loosening factors which cause a displacement of the valve unit 13 in the move-back direction A with respect to the tank body 12 to reduce the tightening force Fsp, include a pressing force Fp against the valve unit 13 received by the pressure from the gas in the container space 14, a thermal expansion of the tank body 12 and the valve unit 13 caused by a change in an ambient temperature, a dimension error including a manufacturing error of the tank body 12 and the valve unit 13, and an external force other than the pressing force Fp that acts on the valve units 13.

A displacement Δx of the valve unit 13 with respect to the tank body 12 due to the loosening factors is the sum of a displacement xp caused by the pressure force Fp, a displacement xT caused by the temperature change, a dimension error xe, and a displacement xF caused by the external force, as shown in the following Equation (2). The displacement xp caused by the pressure force Fp is a value determined with the pressure of the gas in the container space 14, and a pressure-receiving area of the valve unit 13. The displacement xT caused by the temperature change is a displacement generated in accordance with a difference in a coefficient of thermal expansion where materials of the tank body 12 and the valve unit 13 are different.

$$\Delta x = xp + xT + xe + xF \qquad (2)$$

Therefore, as shown in the Equation (2), the spring member 30 is provided so as to satisfy conditions in which the initial displacement x of the spring member 30 is the second displacement x0, the displacement x of the spring member 30 after the valve unit 13 is displaced with respect to the tank body 12 due to the loosening factors is the first displacement x1, and the first displacement x1 is greater than zero. Accordingly, even if the valve unit 13 is displaced due to the loosening factors, the tightening force Fsp will never become zero.

The spring member 30 may be provided with an initial displacement satisfying a condition in which the first displacement x1 is greater than zero. However, in this embodiment, the spring member 30 is provided with an initial displacement satisfying a condition in which the first displacement x1 is much greater than zero (x1>>0). "The first displacement x1 is much greater than zero" means that the first displacement x1 of the valve unit 13 with respect to the tank device 11 which are possibly displaced due to vibrations, impact forces, etc. acting on the tank body 12 is much greater than zero.

Moreover, where a generating force of the spring member 30 in the first displacement x1 is referred to as a first force F1, and a generating force of the spring member 30 in the second displacement x0 is referred to as a second force F0, the spring member 30 may be provided in a state satisfying a condition in which a difference between the first and second forces F1 and F0 is small, and the second force F0 is slightly greater than the first force F1. Moreover, the first force F1 is a value much greater than a relative inertia force Fg to be received by the valve unit 13 with respect to the tank body 12 due to vibrations, impact forces, etc. which acts on the tank device 11 (F0>F1>>Fg). "That the first force F1 is much greater than the inertia force Fg" means that a force which is subtracted by the inertia force Fg from the first force F1 is, by acting on each of the threaded portions 17 and 21 as the tightening force, equal to or greater than a force that can exert the frictional resisting force on the threaded portions 17 and 21 which prevents the rotation of the valve unit 13 with respect to the tank body 12 due to vibrations and impact forces. Here, the second force F0 is a force that can be exerted by the spring member 30 as a result of an easy and manual rotation of the valve unit 13.

According to this embodiment, the spring member 30 is provided so that the spring force is the tightening force Fsp of the threaded portions 17 and 21. By this tightening force Fsp, the spring member 30 is able to produce a tightened state by engaging the threaded portions 17 and 21, and is able to prevent the loosening of the threaded portions 17 and 21. If the tightening force Fsp becomes zero, there is a possibility that the loosening may occur in the threaded portions 17 and 21. Further, the tightening force Fsp may decrease due to the loosening factors. The valve unit 13 receives pressure from the gas in the container space 14 of the tank body 12, and this pressure is one of the loosening factors of the threaded portions 17 and 21. Of course, the loosening factors may include the factors described above other than that due to the pressure. The spring member 30 is provided in the deformed state in which it has the initial displacement x (=x0) greater than the relative displacement of the tank body 12 and the valve unit 13 due to the loosening factors. Even if the tank body 12 and the valve unit 13 are relatively displaced due to the loosening factors, the spring member 30 can be held in the deformed state in which it is deformed from the unloaded state, and can exert a spring force that is equal to the load applying to the spring member 30.

Therefore, even if the tank body 12 and the valve unit 13 are relatively displaced due to the loosening factors, the tightening force Fsp does not become zero, and the loosening of the threaded portions 17 and 21 can be prevented. In addition, the spring force to be exerted by the spring member 30 may be less than the pressing force Fp by the pressure of the gas in the container space 14. That is, the initial tightening torque that is required in order to threadedly couple the valve unit 13 and the tank body 12 may also be less. Further, the strength that is required for the threaded portions 17 and 21 may be less, and the dimension of the threaded portions 17 and 21 may be less as well.

As described above, the loosening of the threaded portions 17 and 21 can be prevented without necessitating extension of the dimension of the threaded portions 17 and 21 and an increase in the initial tightening torque. Further, since the dimension of the threaded portions 17 and 21 may be less, an occupying rate of the opening portion 16 within the tank body 12 may also be less, and the container space 14 may be larger and, thus, a tank volume may be larger.

Moreover, the spring member 30 has the Small Load Change Domain in which the change in the spring force is less, even if the change Δx in the displacement x of the spring member 30 is greater. The Small Load Change Domain may be a domain or range that is greater than the first displacement x1 and less than the second displacement x0, for example. The spring member 30 is provided so that the initial displacement x and the displacement x after the relative displacement of the tank body 12 and the valve unit 13 due to the loosening factors may exist within the Small Load Change Domain. In this embodiment, the initial displacement x is the second displacement x0, and the displacement x after the relative displacement of the tank body 12 and the valve unit 13 due to the loosening factors is the first displacement x1.

Therefore, it is possible to exert a stable and approximately constant spring force so that the tightening force Fsp may not become zero, even if the relative displacement of the tank body 12 and the valve unit 13 due to the loosening factors is greater. Although the loosening factors include the pressure of the container space, as well as the difference in the coefficient of thermal expansion of the first and second members, and the dimensional accuracy of the first and second members, etc., it is possible to prevent the loosening of the threaded portions, even if such loosening factors exist. In other words, it is not necessary to take the coefficient of thermal expansion of the tank body 12 and the valve unit 13 into consideration, it is possible to increase the flexibility in selection of materials, and a high dimensional accuracy of the tank body 12 and the valve unit 13 is not required.

Moreover, the spring member 30 has a sealing characteristic so that it is possible to prevent infiltration of foreign substances, such as water, dirt, and dust, from outside into the threaded portions 17 and 21. Therefore, damage including corrosion of the threaded portions 17 and 21 due to the infiltration of foreign substances may be prevented. In the meantime, where the tank body 12 and the valve unit 13 are made of different materials, and there is water infiltration, there may be a possibility that electrical corrosion or erosion occurs. However, since the infiltration of water can be prevented as mentioned above, the electrical corrosion or erosion can also be prevented. Therefore, strength reduction due to damage to the threaded portions 17 and 21 can be prevented, and durability and reliability can be improved.

Moreover, the spring member 30 is configured to exert the spring force by elastically contacting and being supported by the spring seats 42 and 43 at the contact surfaces 40 and 41 thereof, respectively, and is configured to demonstrate the sealing characteristic by closely contacting the contact surfaces 40 and 41 against the spring seats 42 and 43, respectively. Accordingly, it is possible to achieve a seal as mentioned above while permitting the displacement of the valve unit 13 with respect to the tank body 12, and the manufacturing error of the tank body 12 and the valve unit 13.

Moreover, it is possible to prevent leakage of the gas from the container space 14 by providing the seal member 33. The seal member 33 may be of a rod-seal type that typically is provided between an inner circumferential surface of the first member and an outer circumferential surface of the second member. The seal member 33 is capable of maintaining the sealing characteristic, even if the valve unit 13 is displaced with respect to the tank body 12 and the manufacturing error exists in the tank body 12 and the valve unit 13. Further, the spring member 30 may be configured so that the seal can be maintained, even if the valve unit 13 is repeatedly removed from and attached to the tank body 12.

Further, it is configured to achieve a double seal by the spring member 30 and the seal member 33, while the infiltration of foreign substances from outside is prevented by the spring member 30, the leakage of gas from the container space 14 is prevented by the seal member 33. Accordingly, the spring member 30 may have a tolerance to foreign substances from outside, and the seal member 33 may have a tolerance to gas in the container space 14, while the spring member 30 and the seal member 33 do not need to have tolerances to both foreign substances from outside and gas in the container space. Therefore, it may increase the flexibility in selection of materials for the spring member 30 and the seal member 33, and may increase the durability of the spring member 30 and the seal member 33.

Preferably, the spring member 30 is a special spring member having a spring constant that changes with the displacement x, as mentioned above. This spring member 30 may be a spring member that is made from an annular plate and is formed in a cap shape in which an inner circumference portion protrudes to one axial direction with respect to an outer circumference portion, for example. Such a spring member 30 may also be suitably used for the loosening prevention structure 10 of the tank device 11 in this embodiment.

An alternative use of a coil spring as the spring member 30 may give variety to selection of the spring constant (e.g., giving selectability to a wire diameter of the spring). However, the using of the coil spring may cause a greater dimension of the spring in the axial direction and, thereby reducing the tank volume. Alternatively, a coned disc spring may be smaller in size; however, it has a linear and large spring constant. Therefore, if the loosening prevention is applied using the coned disc spring, where a large displacement of the valve unit 13 with respect to the tank body 12 due to the loosening factors, the initial tightening torque becomes larger. Alternatively, a spring washer or a wave washer may also be smaller. However, contrary to the coned disc spring, its spring constant may be too small for this application. Therefore, the spring washer or wave washer cannot obtain the tightening force Fsp that does not become zero when vibrations and impulse forces act and, thus, they may not be able to realize a suitable loosening prevention as described above. Moreover, the coned disc spring, spring washer, wave washer, etc. are not typically configured to achieve the sealing as described above.

Figure 1:
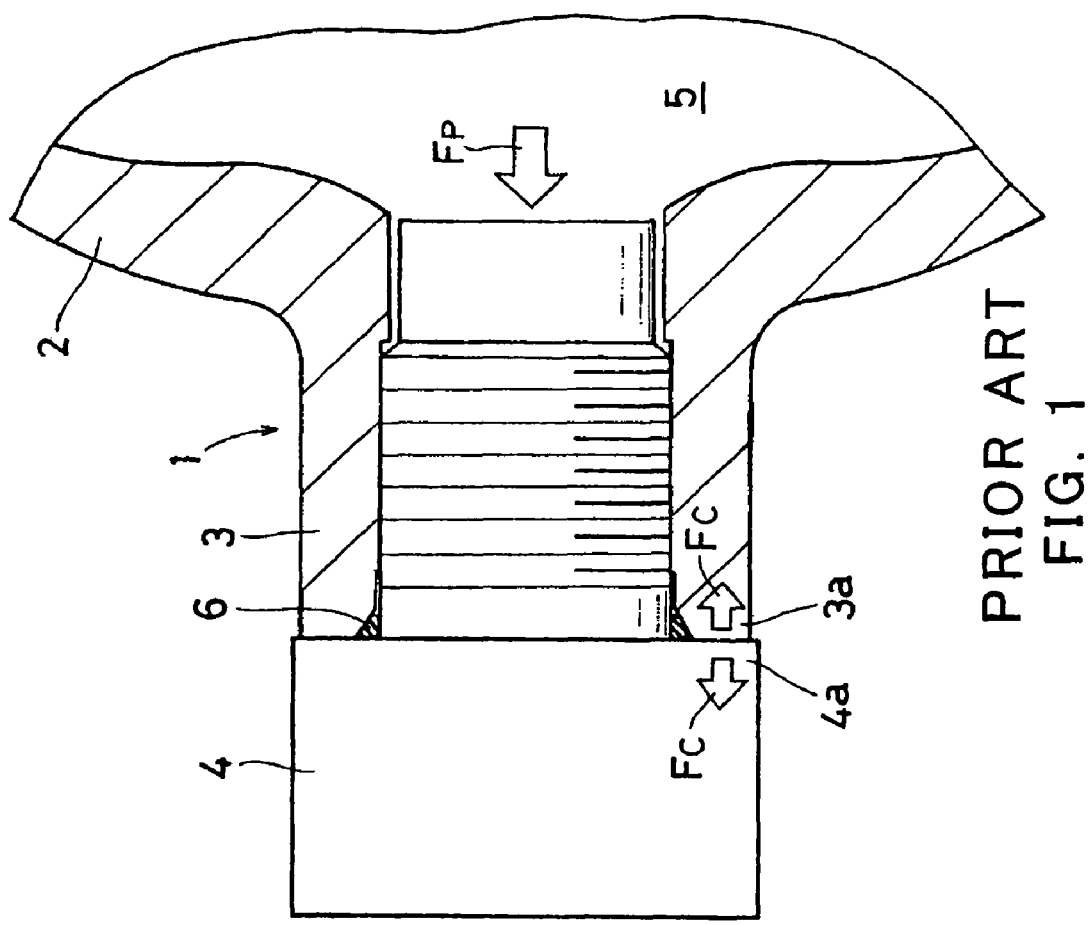
FIG. 1 is a partial cross-sectional view showing a tank device as an example of a conventional gas-pressure device.

The coil spring, coned disc spring, spring washer, and wave washer have such conditions as described above compared with the spring member 30. However, even if the spring member 30 is replaced with the coil spring, coned disc spring, spring washer, or wave washer, it is still not necessary to extend the dimension of the threaded portions or increase the initial tightening torque, and it still can prevent the loosening of the threaded portions. Therefore, this replacement is still advantageous comparing with the conventional configuration that is without a spring member as shown in FIG. 1. Thus, the configuration using the coil spring, coned disc spring, spring washer, or wave washer is also intended to be included in the invention; however, the coil spring, coned disc spring, spring washer, or wave washer may be used preferably with some configuration that can achieve a seal.

As described above, the spring member 30 may be provided in the spring housing space 26 that is small and is obtained by forming a recess 25 in the opening portion 16. In this way, the housing space 26 for housing the spring member 30 for the loosening prevention can be small, and a process to form the housing space 26 may be relatively easy. Therefore, it is possible to realize the loosening prevention with an easy and small configuration.

Moreover, the spring member 30 may have a uniform shape throughout in the circumferential direction as mentioned above, and its spring force acts on the tank body 12 and the valve unit 13 in a state in which the spring force is uniformly distributed in the circumferential direction. Therefore, the stable tightening force Fsp in the axial direction can be given. Furthermore, even if it is repeatedly attached and removed, it can stably exert the same spring force every time, and demonstrate the same sealing characteristic every time. Therefore, the spring member 30 may be recyclable even after the valve unit 13 is once removed from the tank body 12 for maintenance, etc.

By providing such a screw loosening prevention structure 10, a suitable tank device 11 can be realized without the loosening of the threaded portions 17 and 21.

Figure 6:
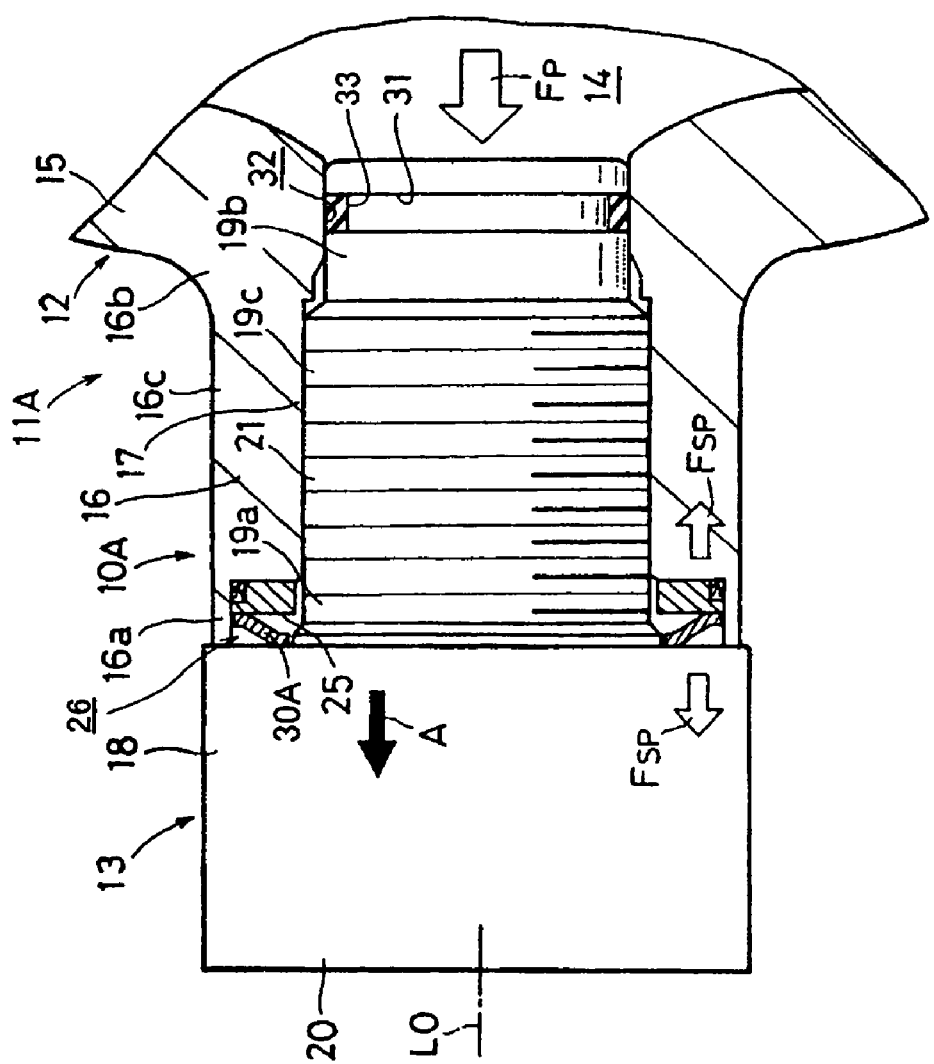
FIG. 6 is a cross-sectional view showing a portion of the tank device equipped with the screw loosening prevention structure according to another embodiment of the invention.
Figure 7:
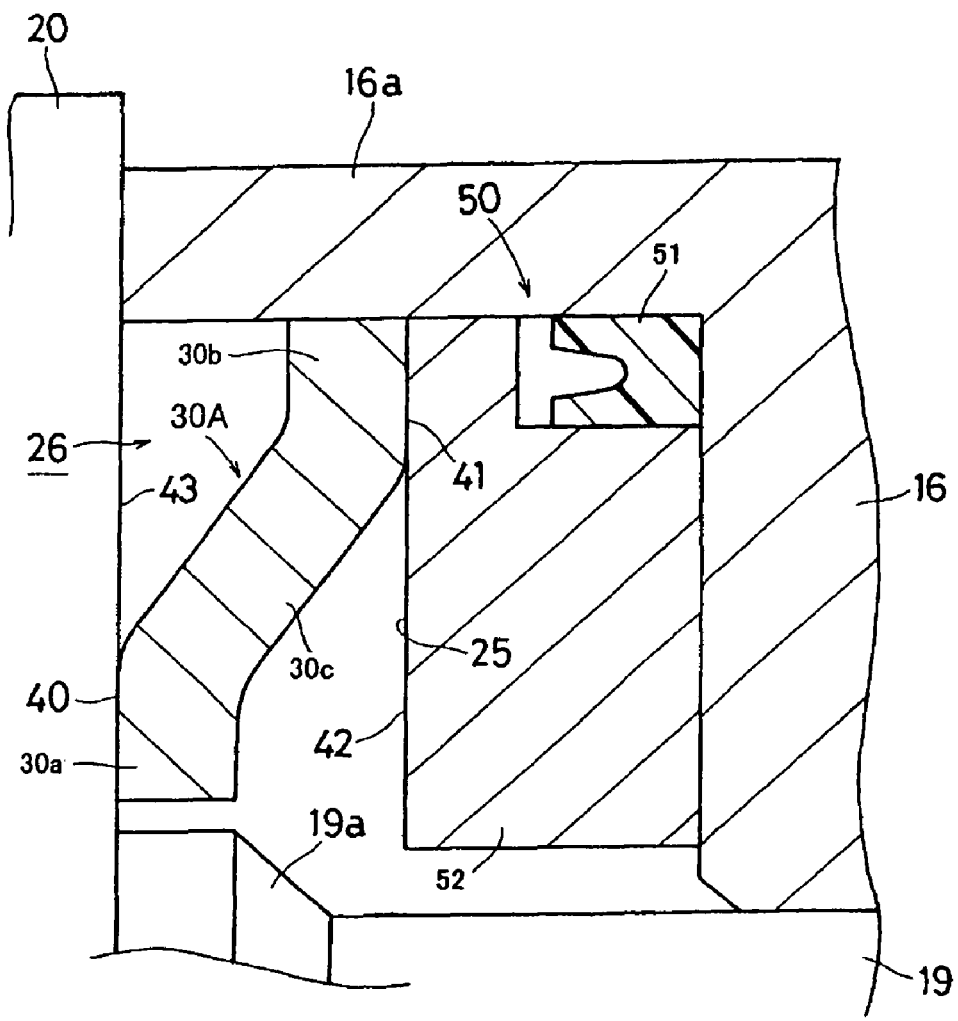
FIG. 7 is an enlarged cross-sectional view showing a section where the spring member in FIG. 6 is provided.

FIG. 6 is a partial cross-sectional view showing a tank device 11A equipped with a screw loosening prevention structure 10A according to another embodiment of the invention. FIG. 7 is an enlarged cross-sectional view showing a section where a spring member 30A of FIG. 6 is provided. The screw loosening prevention structure 10A of the embodiment shown in FIGS. 6 and 7 is similar to the screw loosening prevention structure 10 of the embodiment shown in FIGS. 2-5. Therefore, similar referential numerals are assigned to corresponding portions to explain only different configurations and to omit the explanations of similar configurations. In this embodiment, a pressure-release structure 50 for releasing the pressure of the gas between the seal member 33 and the spring member 30A is provided.

Although the outer circumference contact surface 41 of the spring member 30A is configured to be directly supported by the opening-portion spring seat 42 of the opening portion 16 in the configuration of FIGS. 2-5, a retaining member 52 for retaining a pressure-release seal member 51 is provided between the outer circumference contact surface 41 and the opening-portion spring seat 42 in the configuration of FIGS. 6 and 7. The outer circumference contact surface 41 of the spring member 30A closely contacts the retaining member 52. The pressure-release seal member 51 is retained in the retaining member 52, and provides sealing between the opening portion 16 and the retaining member 52. The pressure-release seal member 51 may be realized by a V-packing, a Y-packing, etc. If an atmosphere pressure becomes higher than the pressure inside the container space 14, the pressure-release seal member 51 contacts the opening portion 16 and the retaining member 52 to achieve sealing. If the pressure inside the container space 14 becomes higher than the atmosphere pressure, the close contact state to the opening portion 16 and the retaining member 52 is released to cancel the sealing. Therefore, while preventing the infiltration of the foreign substances from outside, exhausting of the gas between the seal members 33 and the spring members 30 is allowed.

In this embodiment, the pressure-release structure 50 is configured to include such a pressure-release seal member 51 and retaining member 52. By providing such a pressure-release structure 50, it is possible to prevent the pressure of the gas between the seal member 33 and the spring member 30A from increasing too high, and to prevent the threaded portions 17 and 21 from a failure, such as deformation. For example, where a seal member made of rubber is provided as the seal member 33, even if the gas in the container space 14 penetrates into the seal member 33, and the gas then infiltrates into the space between the seal member 33 and the spring member 30A, the infiltration of the gas prevents the pressure of the gas between the seal member 33 and the spring member 30A from increasing too high and, thus, the tightened state can be suitably maintained.

Although the pressure-release seal member 51 and the retaining member 52 are shown to be provided between the outer circumference contact surface 41 of the spring member 30A and the opening-portion spring seat 42 of the opening portion 16 in the configuration of FIGS. 6 and 7, the pressure-release seal member 51 and the retaining member 52 may be provided between the inner circumference contact surface 40 of the spring member 30A and the head-portion spring seat 43 of the head portion 20. A similar effect can be achieved even with such a configuration.

Figure 8:
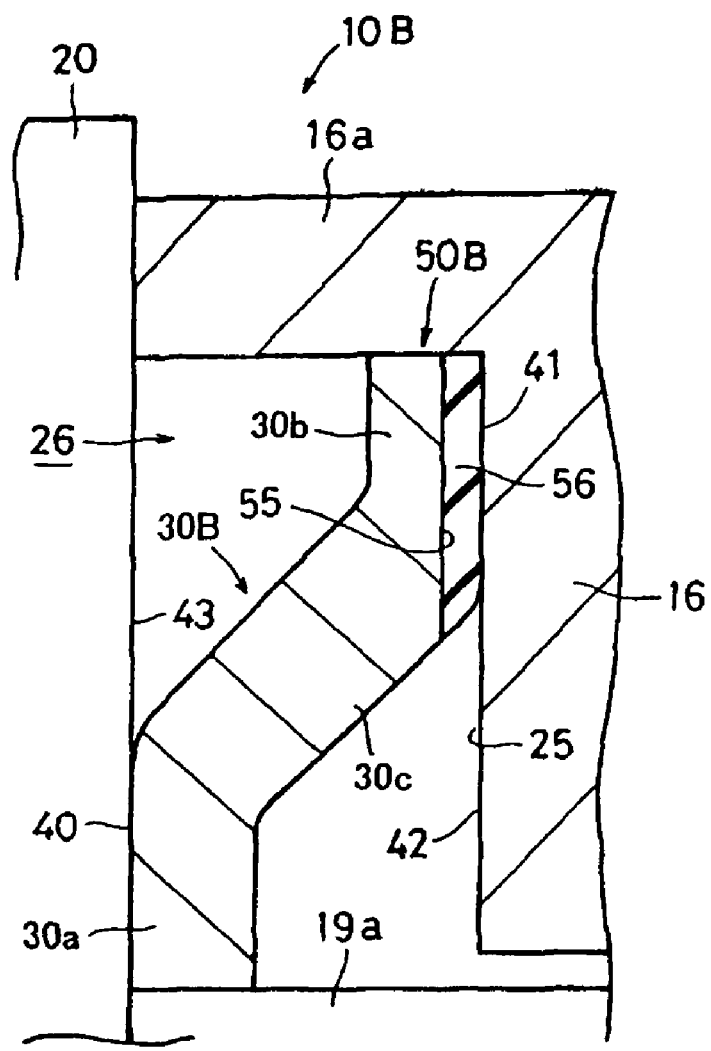
FIG. 8 is a partially enlarged cross-sectional view showing the screw loosening prevention structure according to still another embodiment of the invention.
Figure 9:
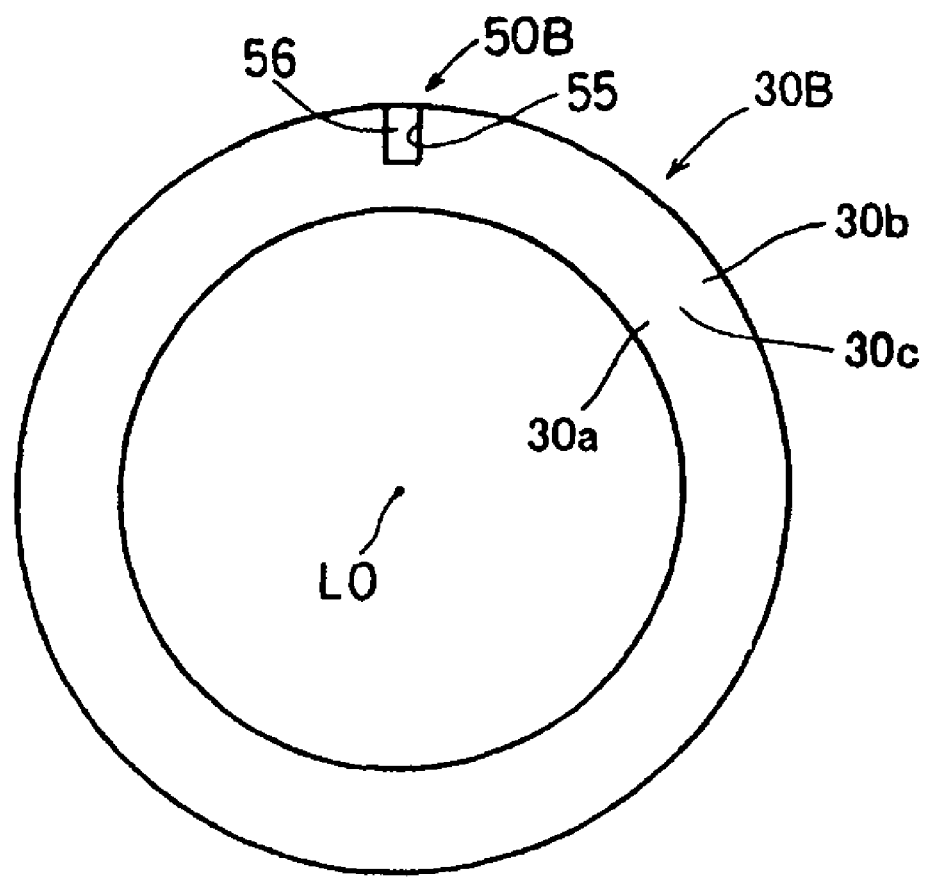
FIG. 9 is a side view showing the spring member used for the screw loosening prevention structure of FIG. 8.

FIG. 8 is a partially enlarged cross-sectional view showing a screw loosening prevention structure 10B according to another embodiment of the invention. FIG. 9 is a side view showing a spring member 30B used in the screw loosening prevention structure 10B of FIG. 8. The screw loosening prevention structure 10B of this embodiment shown in FIGS. 8 and 9 is similar to the screw loosening prevention structure 10 of the embodiment shown in FIGS. 2-5 and, thus, similar reference numerals are assigned to corresponding portions to explain only different configurations, and to omit the explanations for similar configurations. In this embodiment, a pressure-release structure 50B is provided for releasing the pressure of the gas between the seal member 33 and the spring member 30B.

In the configuration of FIGS. 8 and 9, the spring member 30B is provided with a pressure-release slot 55 (refer to FIG. 9) that extends in the radial direction in the outer circumference portion 30b of the spring member 30B, and a pressure-release member 56 is provided so that a portion thereof fits into the pressure-release slot 55. The pressure-release member 56 may be made of rubber including synthetic rubber and crude rubber, or resin, for example. The pressure-release member 56 may be made of a material through which the gas penetrates, that is, the gas passes through from a space on one side to another space on the other side. In this case, the gas between the seal member 33 and the spring member 30B penetrates through the pressure-release member 56, and is exhausted to the exterior space. Therefore, after preventing infiltration of the foreign substances from outside, exhaust of the gas from between the seal members 33 and the spring members 30B is allowed.

The pressure-release structure 50B is configured to include such a pressure-release member 56. By providing such a pressure-release structure 50B, it is possible to prevent the pressure of the gas between the seal member 33 and the spring member 30B from increasing too high, and to prevent the threaded portions 17 and 21 from a failure, such as deformation. For example, where a seal member made of rubber is provided as the seal member 33, even if the gas in the container space 14 infiltrates through the seal member 33, and the gas then infiltrates into the space between the seal member 33 and the spring member 30, it is possible to prevent the pressure of the gas between the seal member 33 and the spring member 30B from increasing too high due to the infiltration of the gas, and it is possible to maintain a suitable tightened state.

Although the pressure-release member 56 is configured to be provided in the outer circumference portion 30b of the spring member 30B in the configuration of FIGS. 8 and 9, it may be configured to be provided in the inner circumference portion 30a of the spring member 30B instead. Moreover, the pressure-release member 56 may be configured so that it is provided to penetrate a connecting portion 30c of the spring member 30B in the thickness direction. A similar effect as described above may be achieved even with such a configuration.

Figure 10:
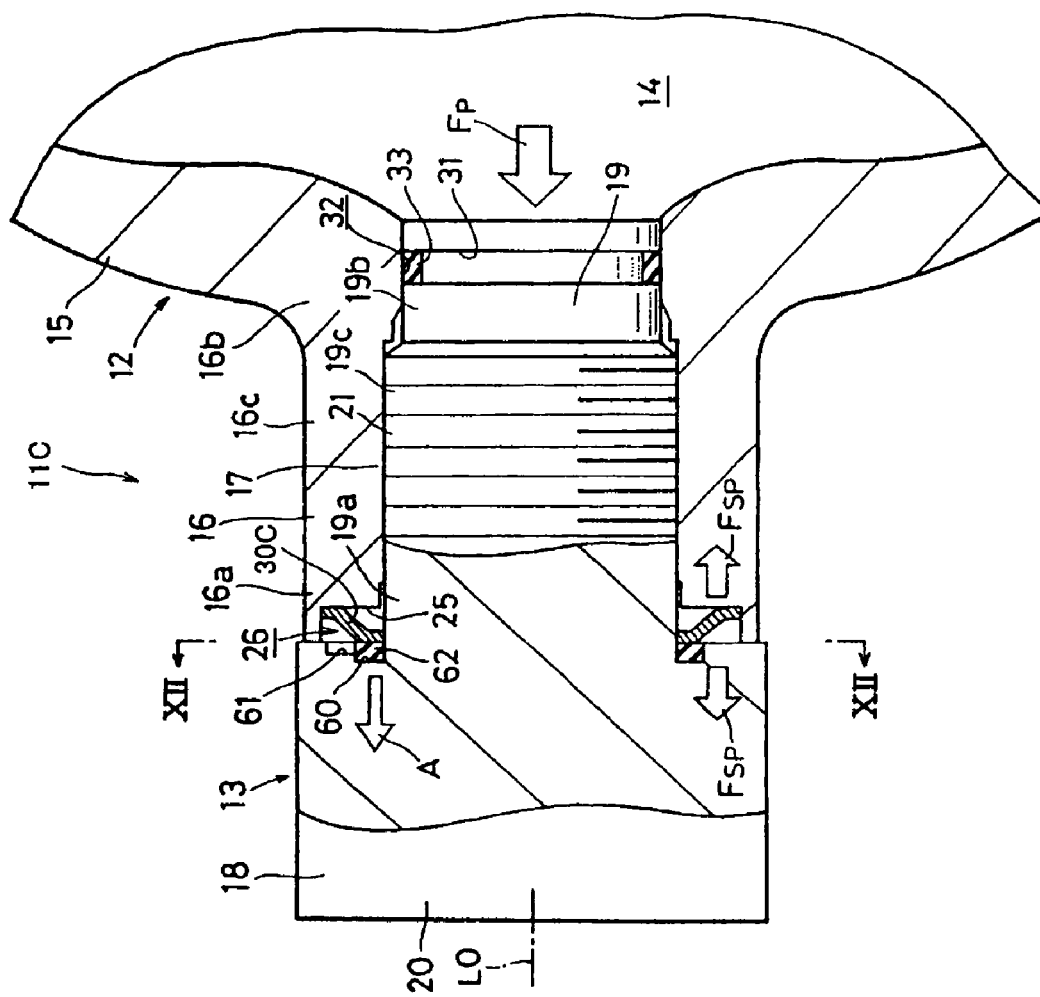
FIG. 10 is a cross-sectional view showing the tank device equipped with the screw loosening prevention structure according to another embodiment of the invention.
Figure 11:
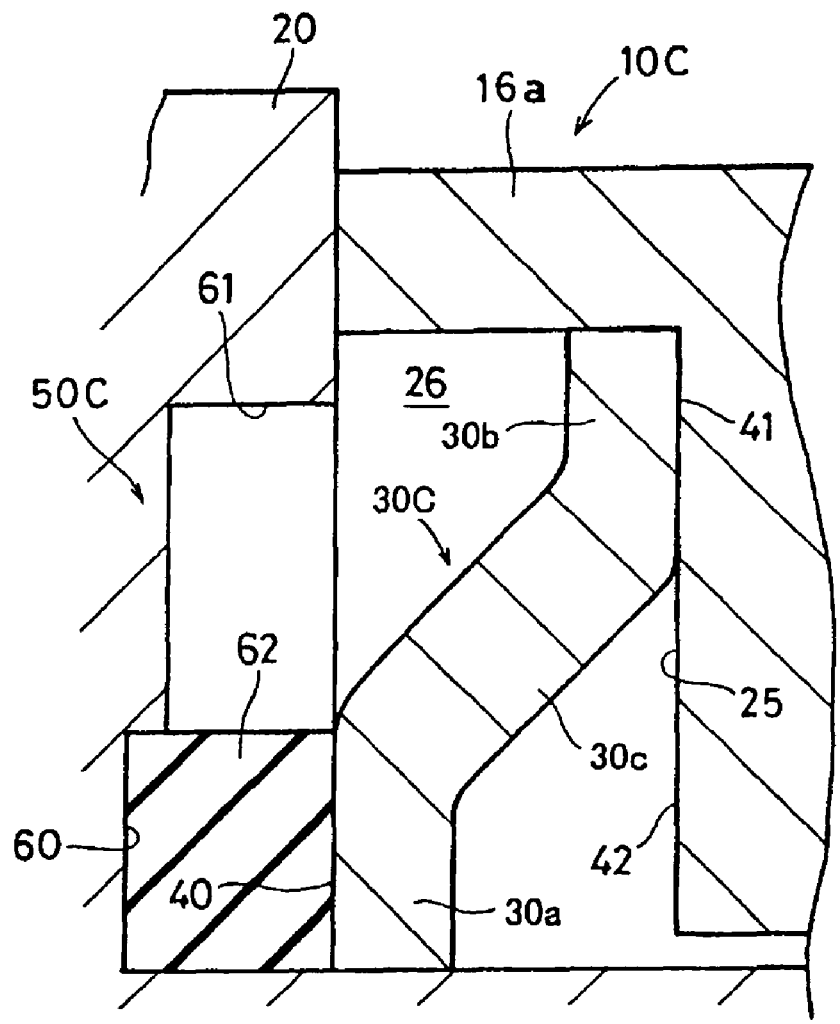
FIG. 11 is an enlarged cross-sectional view showing a section where the spring member in FIG. 10 is provided.
Figure 12:
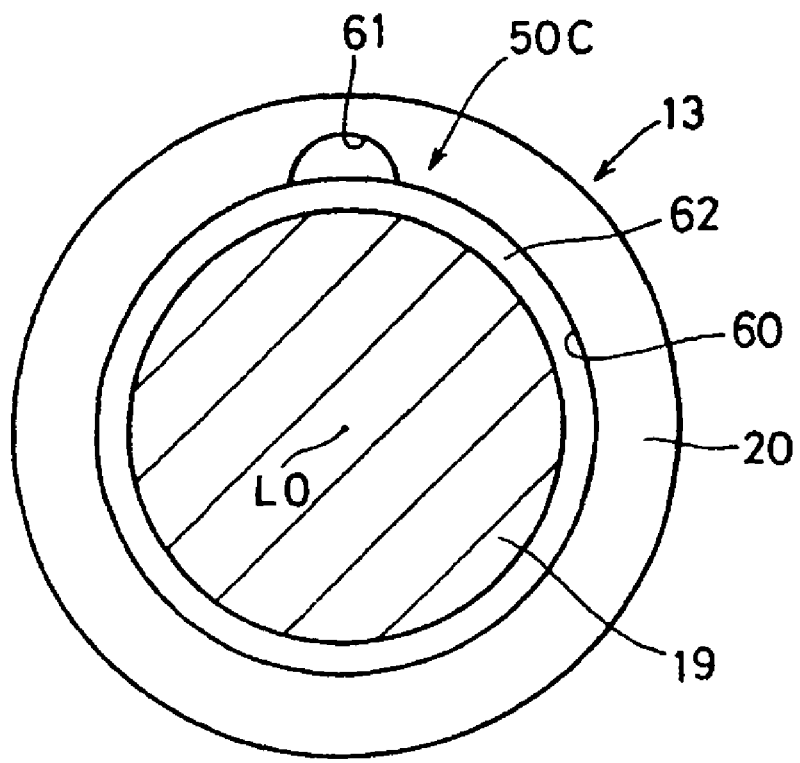
FIG. 12 is a XII-XII cross-sectional view of FIG. 10.

FIG. 10 is a partial cross-sectional view showing a tank device 11C equipped with a screw loosening prevention structure 10C according to another embodiment of the invention. FIG. 11 is an enlarged cross-sectional view showing a section where the spring member 30C in FIG. 10 is provided. FIG. 12 is a cross-sectional view cut along a line XII-XII of FIG. 10. The screw loosening prevention structure 10C of this embodiment shown in FIGS. 10-12 is similar to the screw loosening prevention structure 10 of the embodiment shown in FIGS. 2-5. Therefore, similar referential numerals are assigned to corresponding portions to explain only different configurations, and omit the explanations for similar configurations. In this embodiment, a pressure-release structure 50C is provided for releasing the pressure of the gas between the seal member 33 and the spring member 30C.

In the configuration of FIGS. 10-12, a seal groove 60 is formed in an end surface of the head portion 20 so that it extends throughout in the circumferential direction, and a recess 61 (particularly, refer to FIG. 12) is formed in the end surface of the head portion 20 at one position in the circumferential direction. The recess 61 is formed in a half-circular shape, and is located at a radially outside position of the seal groove 60. The seal groove 60 and the recess 61 are both recessed in the axial direction so that the recess 61 connects with the seal groove 60, and a depth of the recess 61 is shallower than a depth of the seal groove 60. A pressure-release seal member 62 which may be an O-ring is provided in the seal groove 60. The spring member 30C is provided so that an inner circumference contact surface 40 contacts the pressure-release seal member 62. Where the pressure-release seal member 62 is fitted in the seal groove 60 throughout in the circumferential direction, the spring member 30C and the pressure-release seal member 62 cooperate to function as a seal.

In the meantime, there is a step or depth difference between the seal groove 60 and the recess 61, as described above. Where a pressure difference that is defined by subtracting the atmosphere pressure from the pressure of the gas between the seal member 33 and the spring member 30C is lower than a predetermined pressure difference, the pressure-release seal member 62 is maintained in the state in which it fits in the seal groove 60 throughout in the circumferential direction. If the pressure difference becomes higher than the predetermined pressure difference, the pressure-release seal member 62 is pushed out into the recess 61 due to the pressure, and its sealing is canceled. Therefore, it is possible to prevent the infiltration of the foreign substances from outside, and allows the exhaust of gas from between the seal members 33 and the spring members 30C.

The pressure-release structure 50C is configured to include such a pressure-release seal member 62. It is possible to prevent the pressure of the gas between the seal member 33 and the spring member 30 from increasing too high by providing such a pressure-release structure 50C. It is possible to prevent the threaded portions 17 and 21 from a failure, such as deformation. For example, where a seal member made of rubber is provided as the seal member 33, even if the gas in the container space 14 infiltrates through the seal member 33, and the gas then infiltrates into a space between the seal member 33 and the spring member 30C, it is possible to prevent the pressure of the gas between the seal member 33 and the spring member 30 due to the infiltration of the gas from increasing too high, and maintain a suitably tightened state.

Although the pressure-release seal member 62 is provided in a position at which the inner circumference portion 30a of the spring member 30C contacts in the configuration of FIGS. 10-12, this position is not limited. No matter where it may be provided, a similar effect can be achieved as long as it is configured to cancel the seal due to the pressure difference, at least by being displaced at one place in the circumferential direction.

Figure 13:
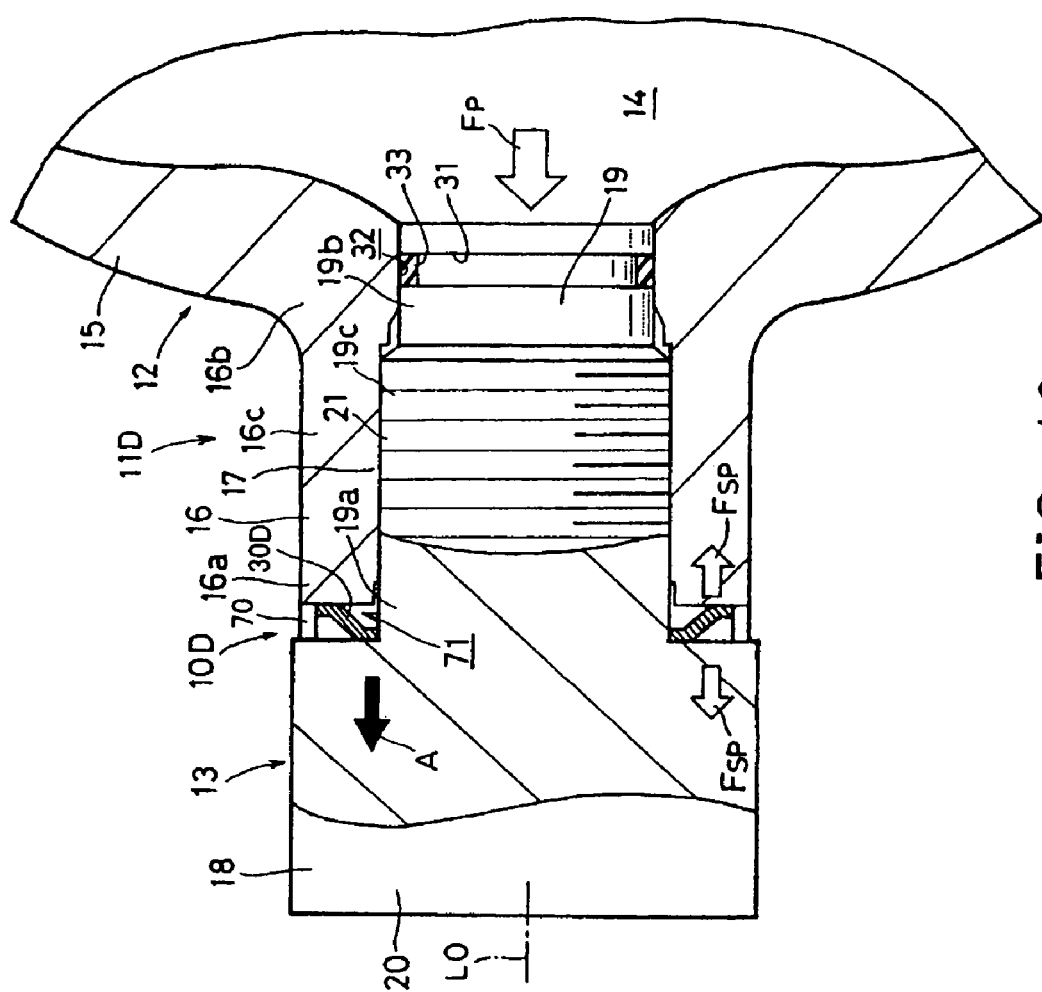
FIG. 13 is a cross-sectional view showing the tank device equipped with the screw loosening prevention structure according to another embodiment of the invention.

FIG. 13 is a cross-sectional view showing a tank device 11D equipped with a screw loosening prevention structure 10D according to still another embodiment of the invention. The screw loosening prevention structure 10D of this embodiment shown in FIG. 13 is similar to the screw loosening prevention structure 10 of the embodiment shown in FIGS. 2-5. Therefore, similar reference numbers are assigned to corresponding parts to explain only differences in configuration, and an explanation of like parts is omitted.

Although the spring housing space 26 is formed by forming the recess 25 in the end surface of the first axial end portion 16a of the opening portion 16 in the configuration of FIGS. 2-5, a spring housing space 71 is formed by providing a sleeve 70 between the end surface of the head portion 20 and the end surface of the first axial end portion 16a of the opening portion 16, and a spring member 30D is provided in the spring housing space 71, as shown in FIG. 13. Thus, the spring member 30D is supported by an opening-portion spring seat that is the end surface in the first axial end portion 16a of the opening portion 16 and a head-portion spring seat that is the end surface of the head portion 20. A similar effect can be achieved even if it is such a configuration in FIGS. 2-5.

The above-mentioned embodiments are merely illustrations of the invention, and those configurations may be modified within the scope of the invention. For example, the configuration of FIG. 13 may be combined with any one of the pressure-release structures 50, 50B, and 50C of FIGS. 6-12. As long as the pressure-release structure is a one-way seal structure that functions as a seal for preventing the infiltration of the foreign substances, such as water, from the outside, it may be of another suitable structure different from than the illustrated examples. Moreover, the gas-pressure device may be a device other than the tank device, and the loosening prevention structure may be those suitably implemented to a portion at which two members are threadedly coupled in the state including the loosening factors, such as gas pressure, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims whether broader, narrower, equal, or different in scope to the original claims, also are regarded as included within the subject matter of the present disclosure.

What is claimed is:

1. A screw loosening prevention structure, comprising:
a first member that is formed with a container space filled with gas, and includes a first threaded portion;
a second member that includes a second threaded portion threadedly engaged with the first threaded portion; and
a spring member provided between the first and second members,
wherein the first member includes a first spring seat for supporting one end portion of the spring member, and the second member includes a second spring seat for supporting the other end portion of the spring member such that the spring member exerts equal and opposite forces on each of the first and second spring seats, and such that the first and second spring seats constrain radial movement of the respective end portions of the spring member;
wherein the spring member is supported by the first spring seat and the second spring seat in a deformed and compressed state, the spring member initially being deformed and compressed with an initial displacement from an unloaded state when the second member is threadedly coupled with the first member by threadedly engaging the first threaded portion of the first member with the second threaded portion of the second member; and
wherein the spring member is compressed with the initial displacement that is greater than a displacement of the spring member caused by a relative displacement between the first member and second member in a direction in which the second member moves back from the first member due to a screw loosening factor including a pressing force against the second member received by the pressure from the gas in the container space, such that the screw loosening prevention structure maintains a tightened state in which the first and second threaded portions are inhibited from disengagement with each other due to spring force acting on the first and second spring seats by the spring member that is maintained deformed and compressed after said relative displacement.

2. The screw loosening prevention structure of claim 1, wherein the spring member has a characteristic in which a spring constant thereof becomes less as a displacement of the spring member becomes greater from an unloaded state of the spring member.

3. The screw loosening prevention structure of claim 2, wherein the spring member has a sealing characteristic, and is provided in a position more distant from the container space than the first and second threaded portions.

4. The screw loosening prevention structure of claim 2, wherein a load acting on the spring member becomes greater as the displacement of the spring member becomes greater from an unloaded state to a second displacement, and the load becomes less as the displacement becomes greater from the second displacement, wherein the spring member has a small load change domain in which the displacement is greater than a first displacement and less than the second displacement and in which a change in the load over a change in the displacement is less than a change in load over a change in displacement in a region of smaller absolute load and smaller absolute displacement than in the small load change domain, and
wherein the initial displacement of the spring member provided between the first and second members in the deformed state is within the small load change domain.

5. The screw loosening prevention structure of claim 4, wherein the initial displacement of the spring member provided between the first and second members in the deformed state is equal to the second displacement.

6. The screw loosening prevention structure of claim 1, wherein the spring member has a sealing characteristic, and is provided in a position more distant from the container space than the first and second threaded portions.

7. The screw loosening prevention structure of claim 6, wherein a seal member is provided between the first and second members, in a position closer to the container space than the first and second threaded portions; and wherein a pressure-release structure is provided to release the pressure of the gas between the seal member and the spring member.

8. The screw loosening prevention structure of claim 1, wherein the spring member is of an annular-plate shape and includes an inner circumference portion, an outer circumference portion and a connecting portion,
wherein the connecting portion is in a truncated cone shape, the inner and outer circumference portions are connected continuously with the connecting portion, the inner circumference portion is spaced from the outer circumference portion in an axial direction, the inner circumference portion and the outer circumference portion are each in a flat plane shape perpendicular to the axial direction,
wherein the outer circumference portion includes an outer circumference contact portion that is an end surface of the outer circumference portion in the axial direction and located opposite from the inner circumference portion, and the inner circumference portion includes an inner circumference contact portion that is an end surface of the inner circumference portion in the axial direction and located opposite from the outer circumference portion,
wherein the first member includes an opening-portion spring seat comprising a surface in close contact with the outer circumference contact portion, and the second member includes a head-portion spring seat comprising a surface in close contact with the inner circumference contact portion, and
wherein the opening-portion spring seat and the head-portion spring seat are each perpendicular to an axis of the first and the second threaded portions.

9. The screw loosening prevention structure of claim 8, wherein the first member includes a first supporting surface for supporting an outer surface of the outer circumference portion, and the second member includes a second supporting surface for supporting an inner surface of the inner circumference portion.

10. The screw loosening prevention structure of claim 1, wherein the displacement of the spring member due to the screw loosening factor is greater than a sum of:
a displacement caused by a pressure force against the second member received by a pressure from the gas in the container space, a displacement caused by a temperature change and generated in accordance with a difference in a coefficient of thermal expansion where a material of the first member and a material of the second member are different, a dimension error, and a displacement caused by an external force acting on the second member.

11. The screw loosening prevention structure of claim 1, wherein each of a first spring force exerted by the spring member in the deformed and compressed state with the initial displacement and a second spring force exerted by the spring member held deformed and compressed after said relative displacement with a displacement greater than zero is much greater than a relative inertia force to be received by the second member with respect to the first member due to vibration and impact force acting on the first and second members.

12. A gas-pressure device, comprising:

a screw loosening prevention structure, including:

a first member that is formed with a container space filled with gas, and includes a first threaded portion;

a second member that includes a second threaded portion threadedly engaged with the first threaded portion; and a spring member provided between the first and second members, wherein the first member includes a first spring seat for supporting one end portion of the spring member, and the second member includes a second spring seat for supporting the other end portion of the spring member such that the spring member exerts equal and opposite forces on each of the first and second spring seats, and such that the first and second spring seats constrain radial movement of the respective end portions of the spring member;

wherein the spring member is supported by the first spring seat and the second spring seat in a deformed and compressed state, the spring member initially being deformed and compressed with an initial displacement from an unloaded state when the second member is threadedly coupled with the first member by threadedly engaging the first threaded portion of the first member with the second threaded portion of the second member; and wherein the spring member is compressed with the initial displacement that is greater than a displacement of the spring member caused by relative displacement between the first member and second member in a direction in which the second member moves back from the first member, due to a screw loosening factor including a pressing force against the second member received by the pressure from the gas in the container space, such that the screw loosening prevention structure maintains a tightened state in which the first and second threaded portions are inhibited from disengagement with each other due to spring force acting on the first and second spring seats by the spring member that is maintained deformed and compressed after said relative displacement.

13. The gas-pressure device of claim 12, wherein the spring member has a characteristic in which a spring constant thereof becomes less as a displacement of the spring member becomes greater from an unloaded state of the spring member.

14. The gas-pressure device of claim 13, wherein the spring member has a sealing characteristic, and is provided in a position more distant from the container space than the first and second threaded portions.

15. The gas-pressure device of claim 12, wherein the spring member has a sealing characteristic, and is provided in a position more distant from the container space than the first and second threaded portions.

16. The gas-pressure device of claim 15, wherein a seal member is provided between the first and second members, in a position closer to the container space than the first and second threaded portions; and wherein a pressure-release structure is provided to release the pressure of the gas between the seal member and the spring member.

* * * * *